Sept. 21, 1948. A. V. DE FOREST 2,449,883
FATIGUE INDICATOR
Filed Jan. 8, 1945
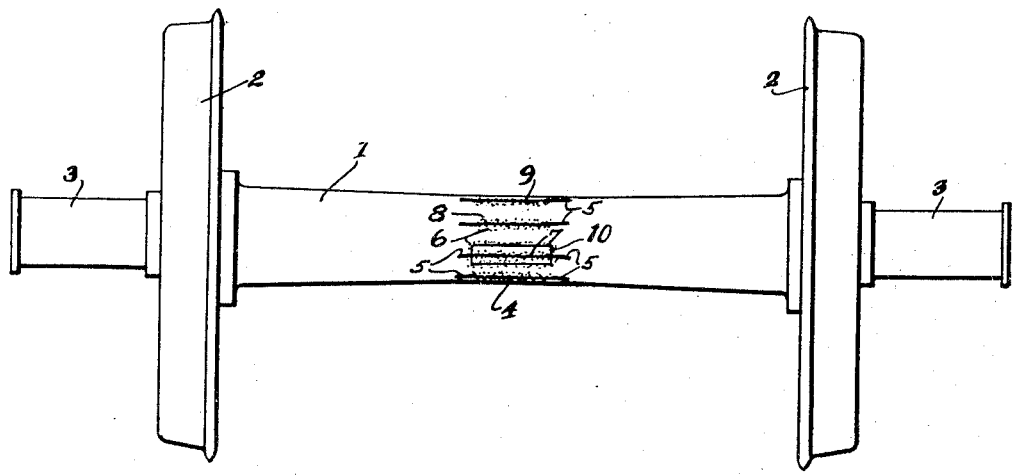
INVENTOR
Alfred V. de Forest
BY
ATTORNEY Patented Sept. 21, 1948

2,449,883

UNITED STATES PATENT OFFICE 2,449,883

FATIGUE INDICATOR

Alfred V. de Forest, Marlboro, N. H., assignor to The Baldwin Locomotive Works, a corporation of Pennsylvania Application January 8, 1945, Serial No. 571,873

2 Claims. (Cl. 73—100)

This invention relates generally to materials testing apparatus and more particularly to a fatigue indicator for use with materials subjected to repetitive forces which ultimately cause failure from fatigue.

There are innumerable machines, structures and devices whose materials are subjected to known and unknown forces which cause fatigue failures. As one instance among many others, railway car axles are subjected to repeated tension and compression strains in the outer fibers of the axle as it rotates. Heretofore it has not been possible to determine when material under such conditions has exceeded its safe limits of use insofar as its fatigue characteristics are concerned or to determine the probable extent of the remaining life of the material.

It is an object of my invention to provide an improved method and apparatus for determining when the fatigue life of material is approached.

A further object is to provide an improved method and apparatus for determining what proportion of the fatigue life has been used.

Other objects and advantages will be more apparent to those skilled in the art from the following description of the accompanying drawing which illustrates the application of my improved method and apparatus to a railway car axle, although it will be apparent that this is merely for purposes of illustration and that my invention may be employed with countless other types of materials or elements in machines and specimens.

The material whose fatigue limits are to be checked or studied is diagrammatically shown in the form of a rotatable axle 1 secured to wheels 2 and provided with usual journals 3. Inasmuch as the weight of the car is supported on the journals 3 the axle 1 is subjected to repeated alternating forces during rotation. Instead of an alternating force being produced by rotation the alternating force can be produced by straight tension and compression forces axially of the material or specimen or it may be caused by bending, torsion or any combination of well-known stresses.

To determine the fatigue limits I provide a filament of electrical conducting material 4 secured to and insulated from the surface of the material under study by cement 6 (speckled area) such as Duco household cement, Bakelite cement, de Kotinsky, Glyptal, shellac, or any other suitable cement. This filament is preferably entirely embedded in the cement and bonded throughout its length to the test surface preferably in the direction of maximum strain and is placed as close as possible to the test surface usually by only the thickness of a thin film of cement which also functions as an electrical insulator. The film may be only two or three thousandths of an inch thick. The filament may be of any desired cross-sectional shape but in general it is preferable to use a fine wire about 0.001" to 0.003" in diameter or a flat ribbon of about 0.001" to 0.003" thick, and 0.010" to 0.10" wide; inasmuch as this diameter of wire affords a bonding area along the length of the filament sufficiently great to cause the bonding agent to transmit all strains from the test surface to the metal filament. The filament may be of any suitable material whose fatigue characteristics are known with an acceptable degree of accuracy and are preferably slightly below those of the specimen or material under test. Hence as the test material is subjected to fatigue strain the conductor will be correspondingly subjected to the same. When the conductor breaks, the fatigue life of the specimen is then known to be approached. To determine when the conductor has broken it is only necessary to attach a battery or other source of current to exposed leads 5 of the conductor. By using a voltmeter or other suitable electrical indicator it will be immediately seen whether the conductor has failed and, if so, the axle or other material may be removed from service or precaution taken for the ultimate failure of the material. If desired, the filament may be first bonded to a thin piece of paper 10 preferably not to exceed 0.001" to 0.003" thick and this paper, in turn, would be cemented throughout its entire area directly to the test surface. The paper would not only serve as insulation, with the wire on the outer surface of the paper, but also the paper would serve as a carrier for the wire before it is placed in use. For purposes of illustration, only one of the filaments, such as 7, is shown with such a paper membrane.

Under certain circumstances it may be desirable to check up on the progress of fatigue in the material under test and in this case a series of filaments 7, 8 and 9, or as many more or less as desired, may be similarly cemented down to the test surface. Each of these various conductors will have different known fatigue limits successively graduated below the limits of the test material and hence they will progressively fail. By testing each conductor from time to time, it is possible to determine the progress of the fatigue action.

From the foregoing disclosures, it is seen that the metallurgical composition of the conductors is determined solely in accordance with their fatigue limits relative to that of the material under test. In some instances brass, copper, bronze, copper-nickel, steel, aluminum and miscellaneous alloys as well as a host of other materials may be used provided that their fatigue characteristics are definitely known in relation to the fatigue characteristics of the material under test.

Thus it is seen that I have provided an extremely simple, accurate and economical fatigue indicator that may be easily and readily installed and tested.

It will of course be understood that various changes in details of construction and arrangement of parts may be made by those skilled in the art without departing from the spirit of the invention as set forth in the appended claims.

I claim:

1. The method of determining the approach of the fatigue limit of a member subject to fatigue strains consisting in attaching to a strainable portion of the member an electrical conductor whose fatigue limit is of a predetermined value below that of the member under test so that the degree of progress of fatiguing may be determined by the fatigue failure of the conductor and then periodically electrically checking said conductor to determine whether the conductor has broken whereupon in the event of a broken conductor it is known that the fatigue limit of the member has at least reached that of the conductor.

2. The method of determining the approach of the fatigue limit of a member subject to fatigue strains consisting in attaching to a strainable portion of the member a plurality of separate electrical conductors of different fatigue limits of predetermined values below that of the member under test, the fatigue limit of said conductors being successively below the fatigue limit of the member whereby the degree of progress of fatiguing may be determined by the successive fatigue of the conductors, and then periodically electrically checking said conductors to determine which of the conductors have failed whereupon the failure of any given conductor is an indication that the fatigue limit of the member has at least reached that of the failed conductor.

ALFRED V. DE FOREST.

REFERENCES CITED

The following references are of record in the file of this patent:

UNITED STATES PATENTS

| Number | Name | Date |
| --- | --- | --- |
| 704,246 | Dunne | July 8, 1902 |
| 1,652,525 | Hahnemann et al. | Dec. 13, 1927 |
| 2,252,464 | Kearns et al. | Aug. 12, 1941 |
| 2,292,549 | Simmons | Aug. 11, 1942 |
| 2,318,102 | Ruge | May 4, 1943 |
| 2,334,843 | Ruge | Nov. 23, 1943 |

OTHER REFERENCES

"Characteristics and Aircraft Applications of Wire Resistance Strain Gages," by A. V. de Forest. Instruments, April 1942, vol. 15, pp. 112, 113, 114, 136 and 137.